US007912567B2

(12) United States Patent
Chhatwal et al.

(10) Patent No.: US 7,912,567 B2
(45) Date of Patent: Mar. 22, 2011

(54) NOISE SUPPRESSOR

(75) Inventors: Harprit Singh Chhatwal, Heston (GB); Hui Li, Fleet (GB); Andrew Linkens, Reading (GB); Mark Smith, Fleet (GB)

(73) Assignee: AudioCodes Ltd., Lod (IL)

( * ) Notice: Subject to any disclaimer, the term of this patent is extended or adjusted under 35 U.S.C. 154(b) by 1049 days.

(21) Appl. No.: 11/714,746

(22) Filed: Mar. 7, 2007

(65) Prior Publication Data

US 2008/0219472 A1 Sep. 11, 2008

(51) Int. Cl.
*G06F 17/00* (2006.01)

(52) U.S. Cl. .......................................... 700/94; 704/226

(58) Field of Classification Search .................... 700/94; 704/226–228; 381/56, 57, 71.8, 71.14, 71.1, 381/71.2, 73.1, 94.1, 94.2, 94.3, 317
See application file for complete search history.

(56) References Cited

U.S. PATENT DOCUMENTS 4,811,404 A 3/1989 Vilmur et al.
5,943,429 A 8/1999 Handel
6,415,253 B1 7/2002 Johnson
6,445,801 B1 9/2002 Pastor et al.
6,643,619 B1 11/2003 Linhard et al.
6,766,292 B1 7/2004 Chandran et al.
7,058,572 B1 6/2006 Nemer
7,072,831 B1 * 7/2006 Etter ............................ 704/226
2005/0071156 A1 * 3/2005 Xu et al. ....................... 704/226
2007/0260454 A1 * 11/2007 Gemello et al. .............. 704/226
2008/0189104 A1 * 8/2008 Zong et al. .................... 704/226

OTHER PUBLICATIONS

"The Enhanced Variable Rate Coder; Toll Quality Speech for CDMA", M. Recchione, International Journal Speech Tech. 2 (1999) 305-315.
"A Noise-Estimation Algorithm for highly non-stationary environments", S. Rangachari, P. C. Loizou, Speech Communication 48 (2006) 220-231.
"Enhancement of Speech Corrupted by Acoustic Noise," Berouti et al., Proc. IEEE ICASSP, pp. 208-211 (Apr. 1979).
"Noise Estimation Techniques for Robust Speech Recognition", Hirsch and Ehrlicher (Proc. IEEE Int. Conf. on Acoustics Speech Signal Processing, 1995, pp. 153-156).
"Assessing local noise level estimation methods: Application to noise robust ASR" Ris and Dupont (Speech Communication 34 (2001) pp. 141-158).

* cited by examiner

*Primary Examiner* — Walter F Briney, III
(74) *Attorney, Agent, or Firm* — Eitan Mehulal Law Group

(57) ABSTRACT

A method of determining noise in an audio stream, the method comprising: acquiring a plurality of consecutive time frames of the audio stream each comprising samples of the audio stream; generating a discrete frequency spectrum for each frame responsive to the frame samples; partitioning the frequency spectrum of each frame into a plurality of same frequency bands; determining an audio energy for each frequency band in each frame; and determining an estimate of noise energy for each frequency band in a temporally last time frame responsive to a relatively small number of smallest values for the audio energy in the frequency band of the plurality of time frames.

22 Claims, 2 Drawing Sheets

NOISE SUPPRESSOR

FIELD

The invention relates to methods for reducing background noise in an audio stream.

BACKGROUND

A noise suppressor in an audio digital communication systems aims to take an audio stream in the presence of background noise and reduce the noise level without degrading signal characteristics or quality. Generally a noise suppressor may be used with a wide variety of audio inputs such as speech or music, and a variety of noise inputs, such as noise generated by a car, fan, train, airplane, and/or babble noise.

To estimate background noise, a spectrum analysis of a time domain audio stream is carried out to give its frequency composition. For an audio stream comprising speech, stationary states associated with speech are generally characterized by durations of about 10 milliseconds. By contrast, background noise in conventional noise suppressors is assumed to be long-term stationary, having a characteristic duration of at least about 0.5 seconds. If spectra recorded over this latter time scale are analyzed, the long-term stationary parts as a function of frequency may be taken as an estimate of the noise.

In the prior art, a variety of noise estimation and noise subtraction algorithms have been developed. Generally, an audio stream is sampled and segmented into consecutive time frames, each optionally having a same duration and comprising a plurality of sequential samples of the audio stream acquired for the period of the time frame. Time frames are labeled by m, where m=0 denotes a current time frame, m=−1 denotes an immediately preceding time frame, and so forth. The samples in each frame define a function of time that represents the audio stream for the period of the time frame.

The samples in the current frame are processed using a Fourier transform to define a frequency spectrum for the audio stream for the period of time of the frame. A frequency range of the spectrum for all frames is divided into a same plurality of frequency bands, and for each frequency band in a given frame, an average value of audio energy spectral density is determined. Optionally, 16 frequency bands of unequal widths are constructed.

The average audio energy associated with each band is hereinafter referred to as "audio spectral energy" or "audio energy" for the band. The audio energies for all the bands for a given frame are referred to as an "audio spectrum" and the audio spectrum for a current frame (m=0) is referred to as the "current audio spectrum".

For a current frame, a value for noise energy spectral density that contributes to the audio spectral energy in a frequency band is determined responsive to the audio spectral energy for the band during a period of time T that includes the current frame and a plurality of previous frames. For convenience of presentation, noise energy spectral density for a given frequency band is referred to as "noise energy" for the band and noise energy in the given frequency band for the time T is referred to as "current noise energy" for the band. The noise energies for all the bands for a given frame are referred to as the "noise spectrum", and the noise spectrum for the current frame is referred to as the "current noise spectrum".

M. Recchione, "The Enhanced Variable Rate Coder; Toll Quality Speech for CDMA", Int. Journ. Speech Tech. 2 (1999) 305-315, and S. Rangachari, P. C. Loizou, "A Noise-Estimation Algorithm for highly non-stationary environments", Speech Communication 48 (2006) 220-231, describe an Enhanced Variable Rate Coder (EVRC) standardized by Telecommunications Industry Association as IS-127. EVRC noise suppression comprises methods described above, including formation of audio spectra in a total of 16 bands. U.S. Pat. No. 4,811,404, incorporated herein by reference, describes a noise suppression method that comprises formation of audio spectra in a total of 16 bands.

The current noise spectrum is used to filter out background noise from a current audio spectrum. Some prior art methods estimate current noise energy for each band (and thereby the current noise spectrum) with the help of speech presence detectors that distinguish noise from speech. Some noise suppressors select minimum audio energies as a function of frequency during time T to represent noise energies. The estimated noise spectrum is used to calculate gain (attenuation) factors for a filter in order to filter out noise and thereby reduce noise from the current audio spectrum. The filter comprises gain factors calculated separately for each band. A lower limit is set for the gain factors to prevent over-reduction of audio energies for frequency bands having very low signal to noise ratio (SNR). A filtered frequency domain audio spectrum is formed by multiplying audio energy in each band by the gain factor of the band of the current audio spectrum. The filtered spectrum is then transformed back from the frequency to the time domain to yield a noise-filtered audio stream having enhanced overall perceived quality.

However, speech quality from prior art noise suppressors generally tends to degrade in relatively high noise environments. Some noise suppressors cause noise flutter, so-called "musical noise", composed of tones at random frequencies that are perceptually unpleasant because of their instability. U.S. Pat. No. 5,943,429, 7,058,572 B1, 6,766,292 B1, 6,415,253 B1, incorporated herein by reference, have modified spectral subtraction algorithms in order to reduce "musical noise". Berouti et al., in a publication entitled "Enhancement of Speech Corrupted by Acoustic Noise," Proc. IEEE ICASSP, pp. 208-211 (April 1979), have clamped gain factors so that the gain factors have a predetermined lower limit. In addition, Berouti et al. propose increasing the noise power spectral estimate by a small margin, a compensation method referred to as "oversubtraction." Although clamping and oversubtraction reduce musical noise, they may do so at a cost of degraded speech intelligibility.

Hirsch and Ehrlicher, in a publication entitled "Noise Estimation Techniques for Robust Speech Recognition" (Proc. IEEE Int. Conf. on Acoustics Speech Signal Processing, 1995, pp 153-156), incorporated herein by reference, estimate noise spectra in an audio stream based on an estimate of minimum audio energy during a time period T (about 0.5 seconds) that includes the current frame and a plurality of previous frames. Ris and Dupont, in a publication entitled "Assessing local noise level estimation methods: Application to noise robust ASR" (Speech Communication 34 (2001) pp. 141-158), incorporated herein by reference, review methods of estimating noise spectra in an audio stream. They describe an "envelope follower" method based on energy evolution within frequency bands and in temporal segments covering several hundred milliseconds.

U.S. Pat. No. 6,766,292B1, incorporated herein by reference, describes a method of detecting speech versus noise, and thereby estimating a noise spectrum. The method uses a probabilistic speech presence measure. In some of the prior art, the estimates of noise spectra are carried out adaptively, in response to a continuous update of noise energy estimates. The noise spectrum estimate of U.S. Pat. No. 6,766,292B1 is made adaptively, responsive to updated estimates of signal to noise ratio (SNR). U.S. Pat. No. 6,445,801, incorporated herein by reference, uses frequency filtering comprising adaptive over-subtraction to suppress noise in an audio stream. U.S. Pat. No. 6,643,619 B1, incorporated herein by reference, uses a noise suppressor having an adaptive filter.

SUMMARY

An aspect of some embodiments of the invention relates to providing a method of reducing noise background in an audio stream.

An aspect of some embodiments of the invention relates to providing a method of determining current noise spectra for the audio stream.

According to some embodiments of the invention, a first estimate of current noise energy (first current noise energy estimate) in a frequency band of the current frame is identified as a minimum audio energy determined responsive to audio energies for the band in a period of time T that includes the current frame and a plurality of previous frames. In an embodiment of the invention, a single minimum audio energy identified in the band during said time T is taken as the first current noise energy estimate. In some embodiments of the invention, for each frequency band, an average of a relatively small, predetermined number of lowest audio energies in the frequency band for time T is taken as the first current noise energy estimate. Optionally, the relatively small predetermined number is less than or equal to ten. Optionally, the number is less than five. In some embodiments of the invention, the number is equal to three.

In some embodiments of the invention, an adaptively determined number of lowest audio energies in a given frequency band is used to estimate the first current noise energy for the given frequency band. Optionally, the number of lowest audio energies is adjusted responsive to a comparison of an estimated SNR (signal to noise ratio) for the given frequency band to an overall band-averaged SNR. Optionally, a larger number of lowest audio energies is used to estimate noise energy for those frequency bands that have relatively very low SNR values.

In some embodiments of the invention, a second estimate of current noise energy for a frequency band of a given current frame is determined recursively as a weighted average of the first current noise energy estimate and a second noise energy estimate for an immediately preceding frame. (The second estimate of the preceding frame is calculated similarly to the second estimate for the current frame as a weighted average of a first estimate of the preceding frame with a second estimate of a frame immediately prior to the preceding frame.)

Optionally, weighting factors for a given frequency band are adaptively adjusted responsive to a comparison of the first current noise energy estimate and the preceding second noise energy estimate. The weighting factors are such that when the first current noise energy estimate is lower than the preceding second noise energy estimate, more weight is given in the weighted average to the first current noise energy than to the preceding second noise energy estimate.

In some embodiments of the invention, the second current noise energy estimate is recursively determined as a weighted average of the first current noise energy estimate and second noise energy estimates of at least two of the preceding frames.

In some embodiments of the invention, a third noise energy estimate is obtained by adaptively adjusting the second noise energy estimate for each frequency band responsive to a comparison of an estimate of signal to noise ratio (SNR) for the given frequency band to an estimated overall band-averaged SNR. Optionally, the SNR estimate is determined responsive to the second noise energy estimate in the band. For low SNR environments, an over-estimation of noise energy is optionally used to estimate noise energy. For higher SNR conditions, an under-estimate of noise energy is optionally used to estimate noise energy.

Estimates of noise energy are used to provide a current noise spectrum, which is used to filter out background noise from a current audio spectrum. The estimated noise spectrum is used to calculate gain (attenuation) factors for a filter that is used to filter and thereby reduce noise in the current audio spectrum. The filter comprises gain factors calculated separately for each band. A lower limit is set for the gain factors to prevent over-reduction of audio energies for frequency bands having very low SNR. A filtered frequency domain audio spectrum is formed by optionally multiplying audio energy and gain factor of each band of the current audio spectrum. The filtered spectrum is then transformed from the frequency domain to the time domain to yield a noise-filtered audio stream.

There is therefore provided in accordance with an embodiment of the invention, a method of determining noise in an audio stream, the method comprising: acquiring a plurality of consecutive time frames of the audio stream each comprising samples of the audio stream; generating a discrete frequency spectrum for each frame responsive to the frame samples; partitioning the frequency spectrum of each frame into a plurality of same frequency bands; determining an audio energy for each frequency band in each frame; and determining an estimate of noise energy for each frequency band in a temporally last time frame responsive to a relatively small number of smallest values for the audio energy in the frequency band of the plurality of time frames. Optionally, the relatively small number is less than 10. Optionally, the relatively small number is less than 5. Optionally, wherein the relatively small number is less than or equal to 3.

In some embodiments of the invention, the relatively small number is determined responsive to an estimate of the signal to noise ratio (SNR) of the band and a band-averaged signal to noise for the last frame. Optionally, determining the relatively small number comprises determining a larger number for frequency bands having a relatively small SNR.

In some embodiments of the invention, the method comprises averaging the relatively small number of smallest values to provide a first estimate of the noise energy for the band.

In some embodiments of the invention, the relatively small number is equal to 1.

Optionally, the method comprising determining a first estimate of the noise energy to be equal to the minimum energy of one smallest value.

Alternatively or additionally, the method comprises determining a second estimate using the first estimate and a noise estimate for the given band determined for at least one time frame preceding the last time frame. Optionally, determining the second estimate comprises determining a weighted average of the first estimate and the noise estimate for the at least one preceding time frame. Optionally, the first estimate is weighted more heavily than the noise estimate of the at least one preceding time frame if the first estimate is greater than the noise estimate of the at least one preceding time frame.

In some embodiments of the invention, the at least one preceding frame comprises a single frame. Optionally, the single frame comprises an immediately preceding frame.

In some embodiments of the invention, the noise estimate for the given band in that at least one preceding frame is a second noise estimate.

In some embodiments of the invention, the method comprises determining a third estimate for each band in the last time frame responsive to the second estimate for the band and a band averaged noise energy for the last time frame. Optionally the method comprises weighting the second noise estimate for the band using a multiplicative weighting factor to provide a first weighted third estimate. Optionally, the method comprises: weighting the first weighted third estimate with a second multiplicative weighting factor to provide a second weighted third estimate; and weighting the first weighted third estimate with an additive weighting factor to provide a third weighted third estimate. Optionally, the method comprises determining a final noise estimate for the band to be equal to a maximum of the second and third weighted third estimate.

In some embodiments of the invention, a weighting factor is determined responsive to an estimate of the signal to noise ratio (SNR) of the band. Optionally, the weighting factor is determined to provide an overestimate of the noise when the signal to noise is relatively low.

There is further provided in accordance with an embodiment of the invention, a method of reducing noise in the audio stream comprising: determining a gain factor for each frequency band responsive to an estimate of noise in accordance with any of the preceding claim: and using the gain factors to provide a corrected audio stream having reduced noise. Optionally, determining a gain factor for a band comprises determining the gain factor responsive to the audio energy in the band. Optionally, the method comprises determining a minimum value for the gain factor for the band responsive to the final noise estimate and the total audio energy for the band.

BRIEF DESCRIPTION OF THE FIGURES

Examples illustrative of embodiments of the invention are described below with reference to figures attached hereto. Dimensions of components and features shown in the figures are generally chosen for convenience and clarity of presentation and are not necessarily shown to scale. The figures are listed below.

DETAILED DESCRIPTION OF EXEMPLARY EMBODIMENTS

Figure 1:
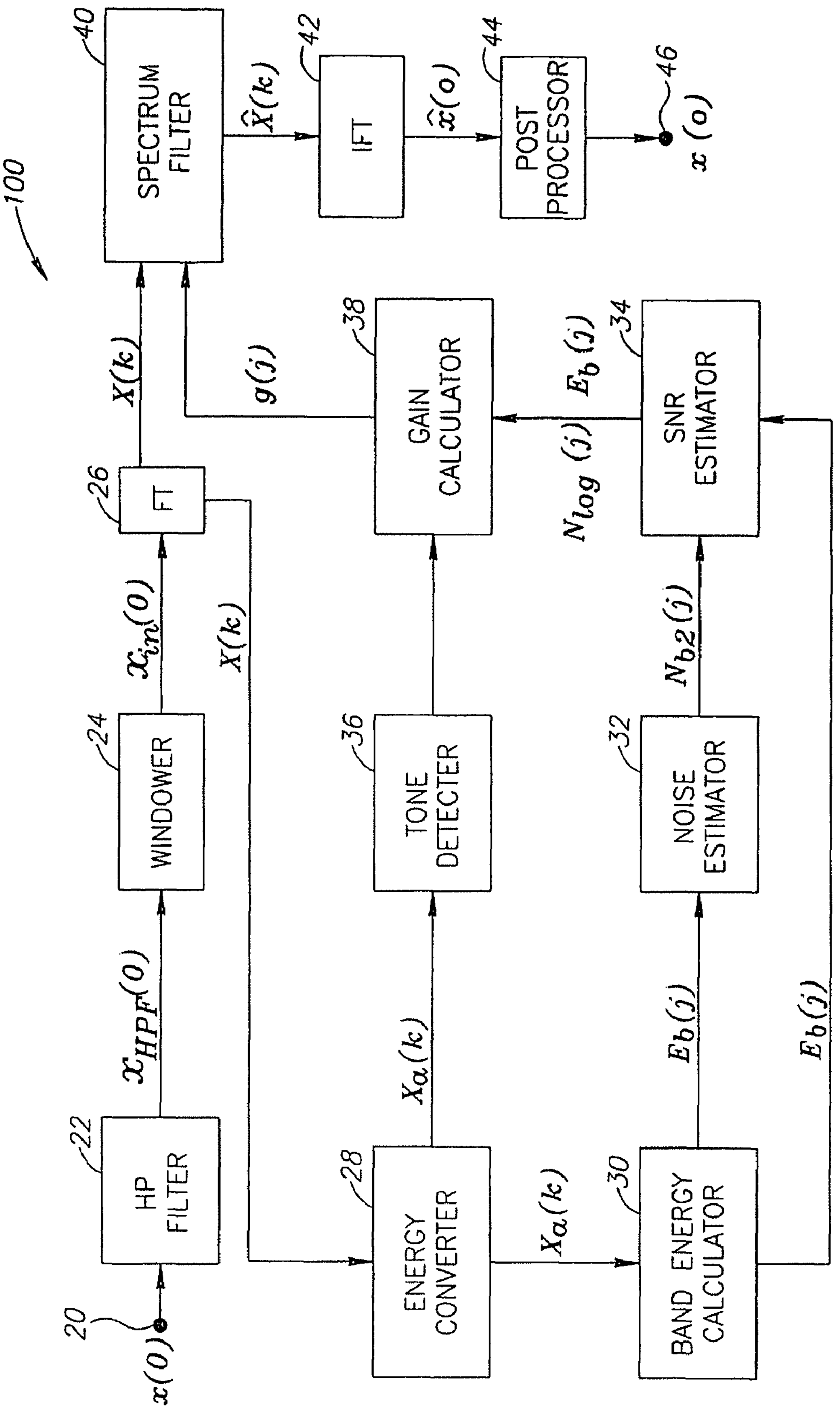
FIG. 1 is a block diagram of an adaptive noise suppressor for reducing noise in an audio stream according to an embodiment the invention.

FIG. 1 shows a block diagram of an adaptive noise suppressor 100 configured for enhancing an audio stream according to an embodiment of the invention. An audio stream (not shown) is sampled and segmented into consecutive time frames, each optionally having a same duration and comprising a plurality of sequential samples of the audio stream acquired for the period of the time flame. Time frames are labeled by m, where m=0 denotes a current time frame, m=−1 denotes an immediately preceding time frame, and so forth. Past and current time frames, including a current time frame being processed, have optionally a 10 millisecond duration, and each comprises 80 samples when a sampling rate of 8 kilohertz is optionally used. An extended frame of samples is optionally formed comprising the 80 samples of the current frame concatenated with optionally 24 samples of an immediately preceding frame, and followed by optionally 24 "0"s for padding. An extended frame of samples for the current frame is referred to henceforth as the "current frame of samples" or as the "current samples", x(0). At any given time, a last constructed extended frame being processed is referred to as a "current time frame" or "current frame". The samples in each frame define a function of time that represents the audio stream for the period of the time frame. Each sample in x(m) of a time frame "m" comprises a contribution from an audio signal and background noise represented respectively by s(m) and b(m) so that x(m)=s(m)+b(m).

Current samples x(0), labeled 20 in FIG. 1, are input to a high pass filter (HPF) 22. HPF 22 operates on current samples x(0) to filter out low frequencies and DC components from x(0) and produce a set of filtered current samples $x_{HPF}(\mathbf{0})$. Samples $x_{HPF}(\mathbf{0})$ comprise frequencies higher than a predetermined threshold frequency. In some embodiments of the invention, the predetermined frequency is a frequency in a range from about 60 Hz to about 120 Hz. In some embodiments of the invention, the predetermined frequency is equal to about 100 Hz. HPF 22 may be implemented by any of a variety of filters known in the art.

Figure 2:
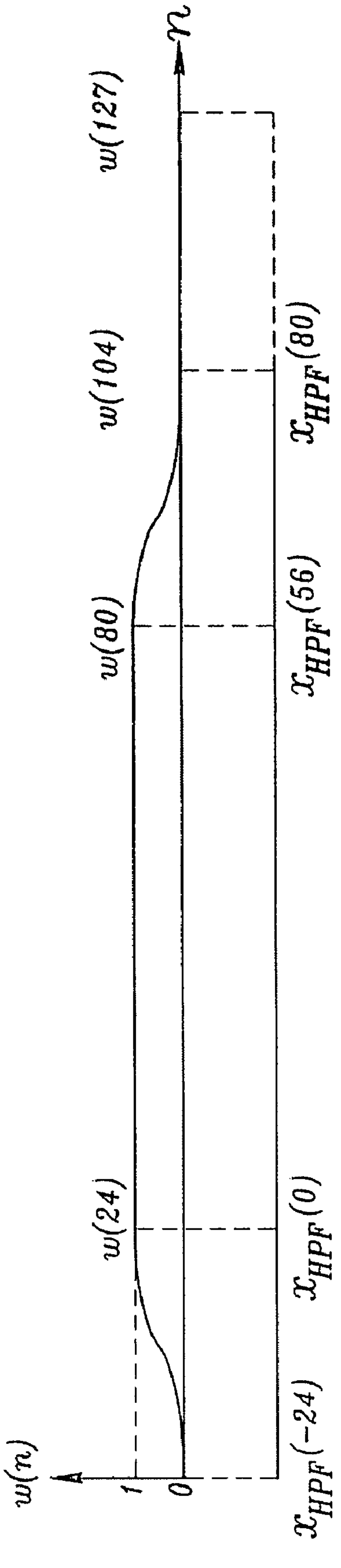
FIG. 2 shows relative position between a frame of samples and a smoothed trapezoidal window function used in analysis of the samples, according to an embodiment the invention.

Filtered current samples $x_{HPF}(\mathbf{0})$ are output from HPF 22 into a windower 24 which multiplies the current samples by a window function to reduce distortions in a following Fourier transform (FT). The window function may be any of a variety of window functions known in the art. For illustration, FIG. 2 shows a smoothed trapezoidal window function. It optionally has a total window size that is 128 samples in length and optionally comprises four segments. The first and second segments are defined respectively by an optionally 24 sample long monotonically increasing function followed by an optionally 56 sample constant function having an amplitude of "1". The third and fourth segments are respectively optionally a 24 sample long segment defined by a monotonically decreasing function followed by an optionally 24 sample long function equal to "0" for padding.

The output of windower 24 comprises a filtered and windowed current sample set "$x_{in}(\mathbf{0})$", which is input to a Fourier transform processor FT 26 wherein $x_{in}(\mathbf{0})$ undergoes a Fourier transform (FT). As suggested by the choice of window length (128 samples) a 128 point FT is optionally used to transform the high-pass-filtered and windowed current samples $x_{in}(\mathbf{0})$ into a discrete frequency spectrum. This spectrum characterizes the audio stream for the period of time of the current frame. As the input is a real signal, a folding operation is optionally employed to convert the 128 point complex valued FT into a 64 point complex-valued frequency spectrum X(k) whose spectral values are audio amplitudes, where k (k=0, 1, . . . , 63) labels a frequency bin. As part of the Fourier transform and folding processing performed by FT 26, input $x_{in}(\mathbf{0})$ is optionally first scaled to a maximum possible value, followed by progressive scaling and full rounding during and between each stage of the FT.

Frequency spectrum X(k) from FT 26 is transferred to an energy converter 28 and a spectrum filter 40. For each frequency bin, energy converter 28 determines an average value of the spectral energy density. Energy converter 28 thereby converts frequency spectrum X(k) to an audio energy spectrum $X_a(k)$, having values that represent audio energy as a function of frequency. The spectrum $X_a(k)$ is optionally input to a tone detector 36 and a band energy calculator 30.

Tone detector 36, using any of various tone detection methods and devices known in the art, analyzes spectrum $X_a(k)$ in order to distinguish a tone signal from noise. It identifies presence of single or double tones (used in telephone communication systems) in one or more frequency bins, and outputs this information to a gain calculator 38. If a tone signal is detected, gain calculator 38 passes the signal unaltered through the noise suppressor. Tone signals are consequently not attenuated and not otherwise treated as noise. Operation of gain calculator 38 is described in more detail below.

Band energy calculator 30 partitions audio energy spectrum $X_a(k)$ into a plurality of optionally 16 frequency bands of unequal widths as shown in Table 1 below. The audio energy associated with each band is obtained by first averaging the audio energies for the spectrum bins corresponding to each band to obtain an averaged "current" audio energy $E'_{band}(j)$ for the band. $E'_{band}(j)$ for each band is optionally smoothed over frames (apart from a first frame), optionally, in accordance with an equation:

$$E_b(j)=E_b(j,-1)+(1-\alpha)E'_{band}(j),\ (j=0, 1, \ldots, 15), \quad \text{(Eq. 1)}$$

In Eq. 1, $\alpha$ is a smoothing parameter optionally having a value between about 0.3 and about 0.9 and $E_b(j,-1)$ is a smoothed spectral value for band "j" for a frame immediately preceding the current frame. Optionally, $\alpha$=0.45.

TABLE 1

| Band construction | | | | | | | | | | | | | | | | |
|---|---|---|---|---|---|---|---|---|---|---|---|---|---|---|---|---|
| | Band | | | | | | | | | | | | | | | |
| | 0 | 1 | 2 | 3 | 4 | 5 | 6 | 7 | 8 | 9 | 10 | 11 | 12 | 13 | 14 | 15 |
| No of bins included | 3 | 3 | 2 | 2 | 2 | 2 | 3 | 3 | 3 | 4 | 4 | 5 | 6 | 7 | 7 | 8 |
| start from bin band_low[ ] | 0 | 3 | 6 | 8 | 10 | 12 | 14 | 17 | 20 | 23 | 27 | 31 | 36 | 42 | 49 | 56 |
| ended at bin band_high[ ] | 2 | 5 | 7 | 9 | 11 | 13 | 16 | 19 | 22 | 26 | 30 | 35 | 41 | 48 | 55 | 63 |

The smoothed audio energies $E_b(j)$ for all the bands for a given frame are referred to collectively as the "audio spectrum" for the frame and the audio spectrum for the current frame is referred to as the "current audio spectrum". An overall band-averaged audio energy $E_{ae}$ for a given frame is obtained by averaging $E_b(j)$ (j=0, 1, . . . , 15) over the bands of the given frame. Band energy calculator 30 optionally determines a 10-based logarithm of $E_{ae\_log}=\log_{10}(E_{ae})$ and "forwards" energies $E_b(j)$, $E_{ae}$, and $E_{ae\_log}$ to a noise estimator 32.

For a current frame, a value for noise energy spectral density that contributes to the audio spectral energy in a frequency band is determined responsive to the audio spectral energy for the band during a period of time T that includes the current frame and a plurality of previous frames. For convenience of presentation, noise energy spectral density for a given frequency band in a frame is referred to as "noise energy" for the band and noise energy in the given frequency band for a current frame is referred to as "current noise energy" for the band. The noise energies for all the bands for a given frame are referred to as the "noise spectrum", and the noise spectrum for the current frame is referred to as the "current noise spectrum".

According to some embodiments of the invention, current noise energies are estimated in an iterative procedure. Noise estimator 32 optionally determines a first estimate of current first noise energy $N_{b1}(j,0)$ (as noted above the second index having a value equal to zero 0 indicates the current frame) for a given frequency band j as a minimum audio energy in the band during the time T. Noise estimator 32 optionally determines a second estimate of the current noise energy $N_{b2}(j,0)$ by taking a weighted average of $N_{b1}(j,0)$ with a similarly determined second estimate for at least one preceding frame. Optionally a signal to noise (SNR) estimator 34 estimates current noise energy by adaptively modifying $N_{b2}(j,0)$ responsive to its SNR as discussed below.

Noise estimator 32 assumes that minimum audio energy in a frequency band characterizes background noise energy in the band. It searches for minimum audio energy within a two dimensional array associated with audio spectra $X_b(j,m)$ where variable j (j=0, 1, . . . , 15) indicates a j-th frequency band and variable m indicates an m-th time frame, with m=0 for a current frame and equal to a negative integer, −1, −2, . . . for a first, second, . . . , frame preceding the current frame. The array is referred to as a Frequency-Time-grid (FT-grid), and comprises $N_{band}$ frequency bands, i.e. j has a maximum value equal to $N_{band}-1$, and a number $(N_f+1)$ of audio spectra corresponding to a number of frames in time T, i.e. m has a minimum value equal to $(-N_f)$. In an embodiment of the invention, $N_{band}$=16 and $N_f$=48; m=−48, . . . , −1, 0 labels time frames. As will be clear to one in the art, other embodiments of the invention may use other values for $N_f$ and $N_{band}$, and numerical values here are only illustrative. In some embodiments of the invention, $N_f$ is chosen in a range 40-80.

In an embodiment of the invention, noise estimator 32 identifies a single minimum value of audio energy in each band in the FT-grid as the first estimate $N_{b1}(j,0)$ of current noise energy in the band. In some embodiments of the invention, noise estimator 32 calculates an average of a number of lowest audio energies in a given band within the FT-grid as the first noise energy $N_{b1}(j,0)$ for the band. In some embodiments of the invention, the number of lowest audio energies is a predetermined number between 2 and about 10. In some embodiments of the invention, the number of lowest audio energies used to determine the first noise energy for a given frequency band "j" is determined responsive to a comparison of an estimated SNR (signal to noise ratio) for the frequency band to an overall band-averaged SNR. The determination is such that a larger number of lowest audio energies is used to estimate the minimum noise energy for those frequency bands that have relatively low SNR values.

Let $SNR_{overall}$ represent the overall band averaged SNR, let SNR(j) represent an estimate for the signal to noise for band j determined for a frame immediately preceding the current frame, and $M_{min}(j)$ the number of lowest audio energies used to determine a first estimate for the noise energy in band j for the current frame. Then, in accordance with an embodiment of the invention:

$$\left.\begin{aligned} &M_{\min}(j) = M_{\min}(j) + 1 \text{ if } SNR(j) < SNR_{overall} * \beta_{up} \\ &M_{\min}(j) = M_{\min}(j) - 1 \text{ if } SNR(j) > SNR_{overall} * \beta_{down} \\ &1 \le M_{\min}(j) \le 10 \end{aligned}\right\} \quad \text{(Eq. 2)}$$

In an embodiment of the invention, $\beta_{up}<1$ (e.g. 0.5) and $\beta_{down}>1$ (e.g. 2.0) and all $M_{min}(j)$ are optionally initialized to $M_{init}=5$ for a first frame. Using this method, adaptation to variations of SNR in an audio spectrum is incorporated to give a more responsive and accurate estimation. In some embodiments of the invention, $\beta_{up}$, $\beta_{down}$, $M_{init}$ are chosen in ranges:

$$\beta_{up}=0.3\text{-}0.8,\ \beta_{down}=1.2\text{-}3.0,\ M_{init}=3\text{-}7 \quad \text{(Eq. 3)}$$

In some embodiments of the invention, a second estimate of the current noise energy is obtained using a smoothing procedure that takes a weighted average of the first estimate of the current noise energy with at least one preceding second noise energy estimate. Thereby, variations of noise energy with time are smoothed out. Weighting factors are adaptively adjusted for each band, depending optionally on a comparison of the current first noise energy with the immediately preceding second noise energy. The comparison is such that optionally, when the current first noise energy estimate is lower than the preceding second noise energy estimate, more weight is given in the weighted average to the current first noise estimate.

Let $N_{b2}(j,m)$ designate the second noise energy estimate for band j and frame m. The smoothing procedure for determining a second estimate $N_{b2}(j,m)$ for the current frame is optionally:

$$N_{b2}(j,0)=\alpha_N(j)N_{b2}(j,-1)+[1-\alpha_N(j)]N_{b1}(j,0)\ (j=0, 1, \ldots, 15) \quad \text{(Eq. 4)}$$

where $\alpha_N(j)$ is a smoothing coefficient Optionally, $\alpha_N(j))$ is determined in accordance with the following expressions:

$$\left.\begin{aligned} &\alpha_N(j) = \alpha_{N-up}(j) && \text{if } N_{b2}(j, -1 \le N_{b1}(j, 0) \\ &\alpha N(j) = \alpha N - \text{down}(j) && \text{if } Nb2(j, -1) > Nb1(j, 0) \\ &(j = 0, 1, \ldots, 15) \end{aligned}\right\} \quad \text{(Eq. 5)}$$

where, optionally:

$$\left.\begin{aligned} &\alpha_{N-up}(0, \ldots, 3) = \{0.95, 0.95, 0.9, 0.8\}, \\ &\alpha_{N-up}(j) = \alpha_{N-up}(3) \text{ for } j = 4, 5, \ldots 15; \\ &\alpha_{N-down}(0, \ldots, 3) = \{0.95, 0.95, 0.9, 0.75\} \\ &\alpha_{N-down}[j] = 0.6 \text{ for } j = 4, 5, \ldots, 15. \end{aligned}\right\} \quad \text{(Eq. 6)}$$

Here $\alpha_{N-up}$ and $\alpha_{N-down}$ are respectively used when the current first noise energy estimate $N_{b1}(j,0)$ exceeds or is less than the preceding second noise energy estimate $N_{b2}(j,-1)$.

Noise estimator 32 determines an overall band-averaged noise energy "$E_{ne}$" for the current frame by averaging $N_{b2}(j, 0)$ over the frequency bands. A 10-based logarithm of $E_{ne}$, $E_{ne\text{-}log}=\log_{10}(E_{ne})$ is also calculated by noise estimator 32. The determined values for the second noise estimate for each band j, $N_{b2}(j)$ of the current frame, and $E_{ne\text{-}log}$ for the current frame from noise estimator 32 are input into SNR estimator 34 noted above.

In accordance with an embodiment of the invention, SNR estimator 34 determines a third estimate of the noise energy for each band to provide an improved estimate of the noise energy and uses the third estimate to provide a band-averaged SNR for the current frame. It is convenient to estimate a logarithm of the third noise energy, so that all following references to the "third noise energy estimate" refer to the logarithm of the third noise energy estimate.

The third noise energy estimate for each band is determined in a calculation comprising optionally two parts, part A and part B.

In part A, an overall band-averaged $SNR_{overall}$ is calculated as:

$$SNR_{overall}=10*[\log(E_{ae})-\log(E_{ne})]=10*(E_{ae\text{-}log}-E_{ne\text{-}log}). \quad \text{(Eq 7)}$$

(Where as noted above, $E_{ae}$ is the band-averaged audio energy for a given frame, and in Eq. 7 it is the band averaged audio energy for the current frame.)

$SNR_{overall}$ is rounded off to a nearest integer to determine a weighting index I:

I=0 if INT $[SNR_{overall}] \leqq 5$,

I=15 if INT $[SNR_{overall}] \geqq 20$, $$\text{otherwise, } I=INT[SNR_{overall}-5], \quad \text{(Eq. 8)}$$

where INT stands for rounding to the nearest integer.

A weighting factor W(I) is selected in accordance with some embodiments of the invention, from a set of values in accordance with an expression:

$$W(I)=\{1.1, 1.08, 1.06, 1.04, 1.02, 1, 1, 1, 1, 1, 0.95, 0.95, 0.95, 0.95, 0.915, 0.915\},$$

$$(I=0, \ldots, 15). \quad \text{(Eq. 9)}$$

A third noise energy estimate $N'_{b\text{-}log\text{-}w1}(j)$ is then calculated as:

$$N'_{b\text{-}log\text{-}w1}(j)=10*(\log N_{b2}(j,0))\cdot W(I) \quad \text{(Eq. 10)}$$

For low or high SNR environments, corresponding respectively to low or high values for index I, SNR estimator 34 via Eq. 10 respectively overestimates or underestimates noise energy. Thereby, improved speech quality is achieved.

In part B the third noise energy estimate in each band of the current frame is determined by weighting the third noise energy estimate made in part A (Eq. 10) using an additional weighting factor based on $SNR_{overall}$. This weighting factor depends on an additive part "$W_{n2\_add}$" and a multiplicative part "$W_{n2\_mult}$", where:

$$\left.\begin{aligned} &W_{n2\_add} = 3.5 \text{ and } W_{n2\_mult} = 1.15 && \text{if } SNR_{overall} \le 5, \\ &W_{n2\_add} = 3.0 \text{ and } W_{n2\_mult} = 1.1 && \text{if } SNR_{overall} = 6, \\ &W_{n2\_add} = 2.0 \text{ and } W_{n2\_mult} = 1.05 && \text{if } SNR_{overall} = 7, \\ &W_{n2\_add} = 1.0 \text{ and } W_{n2\_mult} = 1.0 && \text{if } 8 \le SNR_{overall} \le 10, \\ &W_{n2\_add} = 0.0 \text{ and } W_{n2\_mult} = 1.0 && \text{if } SNR_{overall} \ge 11 \end{aligned}\right\} \quad \text{(Eq. 11)}$$

A final third noise energy estimate $N_{log}(j)$ for each frequency band j is optionally determined in accordance with the following expressions:

$$\left.\begin{aligned} &N_{\log}(j) = \max\{N''_{b\text{-log-}w2\text{-add}}(j), N''_{b\text{-log-}w2\text{-}mult}(j)\}, \text{ where} \\ &N''_{b\text{-log-}w2\text{-}add}(j) = N'_{b\text{-log-}w1(j)} + W_{n2\_add} \\ &N''_{b\text{-log-}w2\text{-}mult}(j) = N'_{b\text{-log-}w1(j)} * W_{n2\_mult} \end{aligned}\right\} \quad \text{(Eq. 12)}$$

Eq. 12 provides an estimate of noise energy that is generally an overestimate of the actual noise energy However, in general it provides a relatively small overestimate for situations in which the SNR is relatively large and a relatively large overestimate when the SNR is relatively small.

The values $N_{log(j)}$, the average band energy for each band of the current and immediately preceding frames $E_b(j,0)$ and $E_b(j,-1)$ respectively and a decision provided by tone detector 36 as to the presence or lack thereof of a single or double tone in each frequency band are transmitted to a gain calculator 38.

Gain calculator 38, calculates a filter gain factor g(j) for band j according to:

$$\left.\begin{array}{l} c = N_{\log}(j) - 10\log E_b(j) \\ g(j) = 1.0 - 10^{c/20} \text{ if } c < 0 \\ g(j) = G_{\min} \text{ if } c \geq 0 \;\; (j = 0, 1, \ldots, 15) \end{array}\right\} \quad \text{(Eq. 13)}$$

Values of g(j) determined in accordance with Eq. 13 that are less than a predetermined minimum gain value $G_{min}$ are set to $G_{min}$ to obviate "over-reduction" of audio energy. In some embodiments of the invention, $G_{min}$ is chosen within a range $G_{min}$=0.25-0.4. In some embodiments of the invention, $G_{min}$ is defined to be 0.35. Using a slightly lower value of $G_{min}$, e.g. 0.25, more effectively reduces noise without causing noticeable distortion to audio quality, but can result in an audio stream sounding unnatural. With $G_{min}$ set to around 0.1~0.15, audio and noise quality both begin to suffer. Higher values for $G_{min}$, e.g. 0.4~0.5 give acceptable audio quality, but provide insufficient noise reduction during very strong noise periods.

In accordance with an embodiment of the invention, following calculation of the gain factors g(j), $E_b(j,m)$ is replaced by $E_b(j,m+1)$ if no tone signal is present for all m in the range −48, −47, . . . −1. This has the effect of updating the memory of the entire FT grid ready for the next frame's calculations. For the case where a tone signal is detected, the band energy $E_b(j,-1)$ is filled with the noise estimate $N_{b2}(j)$ so that, during the processing of future frames, this will result in tones passing through the suppressor with a gain g(j) of close to 1. Expressed via equations, the update is:

$$\left.\begin{array}{ll} E_b(j, m) = E_b(j, m+1) & 0 \leq j \leq 15 \text{ for } 48 \leq m \leq -1 \\ E_b(j, -1) = N_{b2}(j, 0) & 0 \leq j \leq 15 \text{ if tone present} \end{array}\right\} \quad \text{(Eq. 14)}$$

The gain factors go) are used by a spectrum filter 40 to generate a filtered frequency spectrum $\hat{X}(k)$ for the current frame characterized by reduced noise. The filtered frequency spectrum is determined by multiplying each amplitude X(k) (i.e. the amplitude of the frequency in bin k) of the frequency spectrum generated by Fourier transform processor 26 for the current frame by the gain g(j) of the frequency band (Table 1) comprising the frequency bin. In symbols, the filtering performed by spectrum filter 40 may be written:

$$\hat{X}(k)=X(k)\cdot g(j)|_{band\_low(j)\leqq k\leqq band\_high(j)}\, 0\leqq j\leqq 15,\; 0\leqq k\leqq 63 \quad \text{(Eq. 15)}$$

The filtered noise suppressed frequency spectrum $\hat{X}(k)$ from spectrum filter 40 is input into an inverse Fourier transform (IFT) 42. As FT 26 incorporated a pre-scaling to a maximum allowable input level (without risk of overflow), scaled $\hat{X}(k)$ is gradually scaled down in a reverse manner during IFT. After unfolding the IFT into a real temporal sequence, an original scaling factor applied before the FT is reversed to obtain a noise suppressed time domain signal $\hat{x}(\mathbf{0})$.

Output $\hat{x}(\mathbf{0})$ from IFT 42 comprises an extended 128 channel frame of samples. Its channel structure is identical to that of frame of samples $x_{in}(\mathbf{0})$ previously formed by windowing function 24. Output $\hat{x}(\mathbf{0})$ is input to a post processor 44, which in turn outputs a noise suppressed frame of samples $x'(\mathbf{0})$. Post processing optionally comprises an overlap and add (OLA) operation in accordance with any of various methods known in the art that prevents audio energy of output $x'(\mathbf{0})$ from artificially decreasing at its leading edge. Such a decrease could otherwise be present as a remnant of previous windowing carried out by windowing function 24.

In the description and claims of the application, each of the words "comprise" "include" and "have", and forms thereof, are not necessarily limited to members in a list with which the words may be associated.

The invention has been described using various detailed descriptions of embodiments thereof that are provided by way of example and are not intended to limit the scope of the invention. The described embodiments may comprise different features, not all of which are required in all embodiments of the invention. Some embodiments of the invention utilize only some of the features or possible combinations of the features. Variations of embodiments of the invention that are described and embodiments of the invention comprising different combinations of features noted in the described embodiments will occur to persons with skill in the art. It is intended that the scope of the invention be limited only by the claims and that the claims be interpreted to include all such variations and combinations.

The invention claimed is:

1. A method of determining noise in an audio stream, the method comprising:
- acquiring a plurality of consecutive time frames of the audio stream each comprising samples of the audio stream;
- generating a discrete frequency spectrum for each frame responsive to the frame samples;
- partitioning the frequency spectrum of each frame into a plurality of same frequency bands;
- determining an audio energy for each frequency band in each frame; and
- determining an estimate of noise energy for each frequency band in a temporally last time frame responsive to a relatively small number of smallest values for the audio energy in the frequency band of the plurality of time frames,
- wherein the relatively small number is determined responsive to an estimate of the Signal to Noise Ratio (SNR) of the band and a band-averaged SNR for the last frame,
- wherein determining the relatively small number comprises determining a larger number for frequency bands having a relatively small SNR.

2. A method according to claim 1 wherein the relatively small number is less than 10.

3. A method according to claim 2 wherein the relatively small number is less than 5.

4. A method according to claim 3 wherein the relatively small number is less than or equal to 3.

5. A method according to claim 4 wherein the relatively small number is equal to 1.

6. A method according to claim 5 and comprising determining a first estimate of the noise energy to be equal to the minimum energy of one smallest value.

7. A method according to claim 1 and comprising averaging the relatively small number of smallest values to provide a first estimate of the noise energy for the band.

8. A method according to claim 7 and comprising determining a second estimate using the first estimate and a noise estimate for the given band determined for at least one time frame preceding the last time frame.

9. A method according to claim 8 wherein determining the second estimate comprises determining a weighted average of the first estimate and the noise estimate for the at least one preceding time frame.

10. A method according to claim 9 wherein the first estimate is weighted more heavily than the noise estimate of the at least one preceding time frame if the first estimate is greater than the noise estimate of the at least one preceding time frame.

11. A method according to claim 8 wherein the at least one preceding frame comprises a single frame.

12. A method according to claim 11 wherein the single frame comprises an immediately preceding frame.

13. A method according to claim 8 wherein the noise estimate for the given band in that at least one preceding frame is a second noise estimate.

14. A method according to claim 8 and comprising determining a third estimate for each band in the last time frame responsive to the second estimate for the band and a band averaged noise energy for the last time frame.

15. A method according to claim 14 and comprising weighting the second noise estimate for the band using a multiplicative weighting factor to provide a first weighted third estimate.

16. A method according to claim 15 and comprising:

weighting the first weighted third estimate with a second multiplicative weighting factor to provide a second weighted third estimate; and weighting the first weighted third estimate with an additive weighting factor to provide a third weighted third estimate.

17. A method according to claim 16 and comprising determining a final noise estimate for the band to be equal to a maximum of the second and third weighted third estimate.

18. A method according to claim 17, wherein the method is for reducing noise in the audio stream, the method comprising:

determining a gain factor for each frequency band responsive to an estimate of noise;

using the gain factors to provide a corrected audio stream having reduced noise.

19. A method according to claim 18 wherein determining a gain factor for a band comprises determining the gain factor responsive to the audio energy in the band.

20. A method according to claim 19 and comprising determining a minimum value for the gain factor for the band responsive to the final noise estimate and the total audio energy for the band.

21. A method according to claim 15 wherein a weighting factor is determined responsive to an estimate of the signal to noise ratio (SNR) of the band.

22. A method according to claim 21 wherein the weighting factor is determined to provide an overestimate of the noise when the signal to noise ratio is relatively low.

* * * * *